(12) United States Patent
Wang et al.

(10) Patent No.: US 9,478,052 B2
(45) Date of Patent: Oct. 25, 2016

(54) VISUALIZATION METHOD AND SYSTEM BASED ON QUARTILE GRAPH DISPLAY DATA

(71) Applicant: SHENZHEN AUDAQUE DATA TECHNOLOGY LTD, Middle Nanshan District Shenzhen (CN)

(72) Inventors: Mingxing Wang, Shenzhen (CN); Wenfei Fan, Shenzhen (CN); Xibei Jia, Shenzhen (CN)

(73) Assignee: Shenzhen Audaque Data Technology LTD., Shenzhen (CN)

( * ) Notice: Subject to any disclaimer, the term of this patent is extended or adjusted under 35 U.S.C. 154(b) by 0 days.

(21) Appl. No.: 14/655,283

(22) PCT Filed: Aug. 18, 2014

(86) PCT No.: PCT/CN2014/084611
§ 371 (c)(1),
(2) Date: Jun. 24, 2015

(87) PCT Pub. No.: WO2015/043334
PCT Pub. Date: Apr. 2, 2015

(65) Prior Publication Data
US 2016/0196671 A1 Jul. 7, 2016

(30) Foreign Application Priority Data

Sep. 26, 2013 (CN) .......................... 2013 1 0442900

(51) Int. Cl.
*G06T 11/20* (2006.01)
*G06F 3/048* (2013.01)
(Continued)

(52) U.S. Cl.
CPC ......... *G06T 11/206* (2013.01); *G06F 3/04842* (2013.01); *G06F 3/04845* (2013.01); *G06F 17/30716* (2013.01)

(58) Field of Classification Search
CPC .................. G06F 17/30592; G06F 17/30991; G06T 11/206
See application file for complete search history.

(56) References Cited

U.S. PATENT DOCUMENTS

| 2004/0164983 A1* | 8/2004 | Khozai ................. G06T 11/206 345/440 |
| 2008/0207113 A1* | 8/2008 | Josso ..................... H03B 29/00 455/1 |

(Continued)

FOREIGN PATENT DOCUMENTS

| CN | 1409838 | 4/2003 |
| CN | 101571891 | 11/2009 |

OTHER PUBLICATIONS

International Search Report for PCT/CN2014/084611 dated Nov. 28, 2014.

(Continued)

*Primary Examiner* — Jeffrey Chow
(74) *Attorney, Agent, or Firm* — Dicke, Billig & Czaja, PLLC

(57) ABSTRACT

The present invention provides a visualization method based on quartile graph display data, the method comprising: the step of defining a data grid (Gx) and determining the display scale of the X axis; the steps of data source configuration, scanning, and reading; the step of analyzing stored data and correcting the X axis to display the scale, and calculating the quartile of the data in each data grid (Gx) of each scale level; the step of using a quartile graph to display the data. By means of defining a data grid (Gx) to store data, the four display scales of the X axis being interchangeable, and using a quartile graph to display data, the present invention displays the distribution of two-dimensional data in extremely large-volume data or big data environments, and provides interactive functionality. The present invention also provides a visualization system based on quartile graph display data.

13 Claims, 1 Drawing Sheet

(51) Int. Cl.
*G06F 17/30* (2006.01)
*G06F 3/0484* (2013.01)

(56) References Cited

U.S. PATENT DOCUMENTS

| | | | | |
|---|---|---|---|---|
| 2009/0001286 | A1* | 1/2009 | Kearfott | G01T 1/11 250/484.2 |
| 2009/0002373 | A1* | 1/2009 | MacGregor | G06F 17/30572 345/440.2 |
| 2010/0191678 | A1* | 7/2010 | Steed | G06T 11/206 706/11 |
| 2014/0354635 | A1* | 12/2014 | Nascetti | G01C 11/06 345/420 |
| 2015/0061666 | A1* | 3/2015 | Kempf | G01R 33/282 324/307 |
| 2016/0117373 | A1* | 4/2016 | Dang | G06F 17/30601 707/634 |

OTHER PUBLICATIONS

Written Opinion of the International Searching Authority for PCT/CN2014/084611 dated Nov. 28, 2014.

* cited by examiner

VISUALIZATION METHOD AND SYSTEM BASED ON QUARTILE GRAPH DISPLAY DATA

TECHNICAL FIELD

The present disclosure relates to data process field, and particularly to a visualization method and system for displaying data based on a quartile graph.

BACKGROUND

A Quartile graph, a diagram displaying the distribution of one-dimensional data, can directly show the distribution pattern of data, including five data points: lowest quartile, first quartile, median quartile, third quartile and highest quartile. The lowest quartile and the highest quartile refer to the minimum value and the maximum value respectively, the first quartile means that 25% of all the data is less than the value corresponding to the first quartile, similarly, the median quartile means that 50% of all the data is less than the value corresponding to the median quartile, and the third quartile means that 75% of all the data is less than the value corresponding to the third quartile. The quartile graph is only a tool for displaying, and only for displaying the distribution of one-dimensional data. Hence there lacks a visualization method for displaying the distribution of two-dimensional data by using a quartile graph.

SUMMARY

Consequently, the present disclosure is aimed to solve one of the above-mentioned drawbacks.

Therefore, the present disclosure provides a visualization method and system for displaying data based on quartile graph. By means of defining a data grid (Gx) to store data, the four display scales of the X axis being interchangeable, and using a quartile graph to display data, the present invention displays the distribution of two-dimensional data in extremely large-volume data or big data environments, and provides interactive functionality.

Therefore, a visualization method for displaying data based on quartile graph is provided in one embodiment of the present disclosure, the method comprising:
the step of defining a data grid (Gx) and determining the display scale of the X axis;
the steps of data source configuration, scanning, and reading;
the step of analyzing stored data and correcting the display scale of the X axis, and calculating the quartile of the data in each data grid (Gx) of each scale level;
the step of using a quartile graph to display the data.

In one embodiment of the present disclosure, the step of defining a data grid Gx and determining the display scale of the X axis comprises: calculating the value range of an independent variable X, and performing a discretization on the independent variable X.

In one embodiment of the present disclosure, the step of defining a data grid Gx and determining the display scale of the X axis further comprises: according to the value range of the independent variable X, adjusting the maximum and minimum values of X, and then dividing the value range equally into a series of Gx.

Preferably, there are four display scales which are interchangeable with each other.

In one embodiment of the present disclosure, the steps of data source configuration, scanning, and reading comprises:
performing data source configuration according to the independent variable X and dependent variable Y;
obtaining the minimum and maximum values of the independent variable X, performing an adjustment on the maximum and minimum values according to a value range;
scanning the data source, reading every recorded values of X and Y: x and y, and calculating the data grid Gx corresponding to x and y, saving the data into Gx.

Preferably, the calculated quartile of the data in each data grid Gx of each scale level comprises: lowest quartile, first quartile, median quartile, third quartile, and highest quartile.

In one embodiment of the present disclosure, the step of using a quartile graph to display data comprises: the data to be displayed by using a quartile graph is the data stored in Gx.

Preferably, the step of using a quartile graph to display data further comprises: the display is performed a change to the upper limit or the lower limit and an overall movement in a dragging manner within the range enclosed by the upper limit and the lower limit.

Preferably, the step of using a quartile graph to display data further comprises:
selecting a region to perform the display, the display refers to detailed information corresponding to the data grid Gx.

Another embodiment of the present disclosure provides a visualization system for displaying data based on quartile graph, the system comprising: a data grid defining unit configured for defining a data grid (Gx) and determining the display scale of the X axis; a data source obtaining unit configured for data source configuration, scanning, and reading; a data source storing unit configured for analyzing stored data and correcting the display scale of the X axis, and calculating the quartile of the data in each data grid (Gx) of each scale level; a data display unit configured for using a quartile graph to display the data.

According to the minimum and maximum values of the independent variable X determined by the data grid defining unit, the data source obtaining unit performs an adjustment on the maximum and minimum values according to a value range, and scans the data source to read out every recorded values of X and Y: x and y, and calculates the data grid Gx corresponding to x and y. The data displayed by the data display unit is the data within the data grid Gx stored by the data source storing unit.

DETAILED DESCRIPTION

The present disclosure will be described in detail by reference to the accompanying drawings and embodiments for more clearly understanding of the objects, technical features and advantages of the present disclosure. It should be understood that specific embodiments described herein are intended for purposes of illustration only and are not intended to limit the scope of the present disclosure.

The present disclosure provides a visualization method and system for displaying data based on a quartile graph. By means of defining a data grid (Gx) to store data, and using a quartile graph to display data, the present disclosure implements visualization of data display in extremely large-volume data, and can be used in data display and data analysis.

Figure 1:
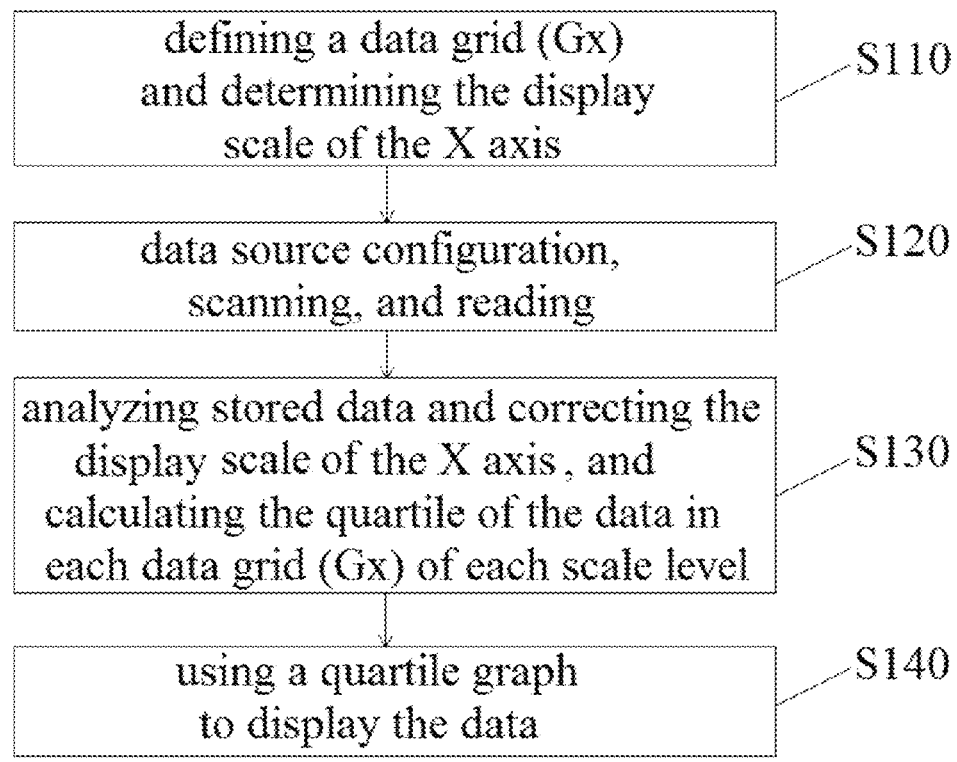
FIG. 1 is a detailed flowchart illustrating a visualization method for displaying data based on quartile graph provided in one embodiment of the present disclosure.

As shown in FIG. 1, it is a detailed flowchart illustrating a visualization method for displaying data based on a quartile graph provided in one embodiment of the present disclosure. The specific steps of the method are as follows:

Step S110: defining a data grid Gx and determining the display scale of the X axis.

Figure 2:
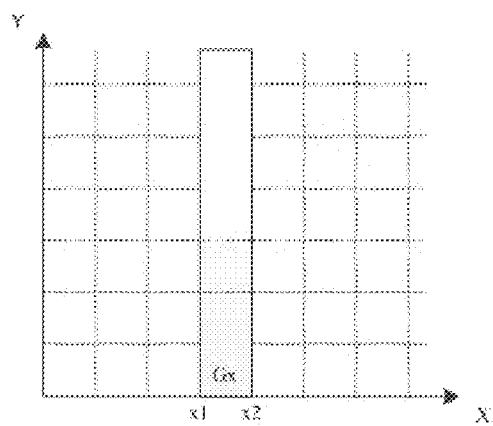
FIG. 2 is a schematic diagram of the data grid Gx defined in one embodiment of the present disclosure.

In one embodiment of the present disclosure, to display a two-dimensional quartile graph, it is needed to calculate the value range of an independent variable X firstly and discretize the independent variable X. And according to the value range of the independent variable X, the maximum and minimum values of X are adjusted, then the value range is divided equally into a series of Gx. Referring to FIG. 2, the data grid Gx is defined as follows:

defining Gx{x1, x2} as G{(x,y)|x1<=x<x2}, Gx for short, i.e., all points (x,y) satisfied x1<=x<x2.

Step S120: performing data source configuration, scanning and reading.

In this step, data source configuration is performed on the data source based on the independent variable X and dependent variable Y, thus obtaining the minimum and maximum values of the independent variable X, then according to the value range, the maximum and minimum values are adjusted to make the minimum and maximum values to be the multiple of the nth power (n is an integer) of 10, i.e., Xmin (or Xmax)=m*10^n. For example, the actual value range of X is [0.1,983.7], the minimum value of the adjusted X is 0 and the maximum value is 1000, i.e., the value range is changed to be [0, 1000]. According to the adjusted X axis, the value range is divided into a series of Gx with equal intervals, and the interval scale Sx of Gx will be dynamically identified to be the nth (n is an integer) of ten, i.e., s=10^n, with possible values of 1, 10, 100, 1000000, 0.1, 0.01 and more. Moreover, to support zoom function, three Gx display scales will be supported simultaneously in the present system with interchange (n is continuous, and it will be correspondingly enlarged or decreased ten times at each time of interchange). Four Gx display scales will be dynamically identified, with an identification measure of equally dividing the X axis into 10-100 Gx at the maximum display scale, for example, if the distribution interval of data X is 0 to 50000, the Gx display scales supported by the present system will be: 1, 10, 100, and 1000.

The data source is scanned to read out every recorded values X and Y i.e. x and y, thus calculating the data grid Gx corresponding to x and y, and storing the data to the Gx. For example, if x=155.3 and the scale of the X axis is "10", 155.3/10=15.53, then Gx is Gx{150,160}, while the scales is "1", Gx belongs to Gx{155,156}.

Step S130: analyzing stored data and correcting the display scale of the X axis, and calculating the quartile of the data in each data grid of each scale level.

After reading out the data, the stored data is analyzed, the display scale of the X axis is corrected in a way that a small-level scale is deleted when the number of effective Gx within the small-level scale (if the record number within Gx is greater than 0, Gx is effective) is less than twice the number of effective Gx within its upper-level scale. The reason for deleting the scale is that, when the small-level scale is developed to the upper level scale, the resulting information does not increase much, so the details of actual data fail to be developed effectively. The maximal effective display scale to be determined to remain is the initial display scale. The calculated quartile of the data in each data grid of each scale level comprises: lowest quartile, first quartile, median quartile, third quartile, and highest quartile.

Step S140: using a quartile graph to display big data.

In one embodiment of the present disclosure, the data displayed by using a quartile graph is the data stored in Gx. The display can be performed a change to the upper limit or lower limit and performed adjusting the upper and the lowers limit together with remaining the range enclosed by the upper and the lower limits in a dragging manner. It can be interchanged among the four display scales of the X axis, and when a region within the quartile graph is selected by a mouse, detailed information within the corresponding data grid Gx will be displayed.

Another embodiment of the present disclosure provides a visualization system for displaying big data based on quartile graph, the system comprising: a data grid defining unit configured for defining a data grid (Gx) and determining the display scale of the X axis; a data source obtaining unit configured for data source configuration, scanning, and reading; a data source storing unit configured for analyzing stored data and correcting the display scale of the X axis, and calculating the quartile of the data in each data grid (Gx) of each scale level; a data display unit configured for using a quartile graph to display the data.

According to the minimum and maximum values of the independent variable X determined by the data grid defining unit, the data source obtaining unit performs an adjustment on the maximum and minimum values according to a value range, and scans the data source to read out every recorded values of X and Y: x and y, and calculates the data grid Gx corresponding to x and y. The data displayed by the data display unit is the data within the data grid Gx stored by the data source storing unit. By means of defining a data grid (Gx) to store data, the four display scales of the X axis being interchangeable, and using a quartile graph to display data, the present invention displays the distribution of two-dimensional data in extremely large-volume data or big data environments, and provides interactive functionality.

What is described above is a further detailed explanation of the present disclosure in combination with specific embodiments; however, it cannot be considered that the specific embodiments of the present invention are only limited to the explanation. For those of ordinary skill in the art, some simple deductions or replacements can also be made under the premise of the concept of the present invention.

What is claimed is:

1. A visualization method for displaying data based on quartile graph, the method comprising:
   the step of defining a data grid (Gx) and determining the display scale of the X axis by calculating the value range of an independent variable X, and performing a discretization on the independent variable X;
   the steps of data source configuration, scanning, and reading;
   the step of analyzing stored data and correcting the display scale of the X axis, and calculating the quartile of the data in each data grid (Gx) of each scale level;
   the step of using a quartile graph to display the data.

2. The method according to claim 1, wherein the step of defining a data grid Gx and determining the display scale of the X axis further comprises:
   according to the value range of the independent variable X, adjusting the maximum and minimum values of X, and then dividing equally the value range into a series of Gx.

3. The method according to claim 1, wherein there are four display scales which are interchangeable with each other.

4. The method according to claim 1, wherein the steps of data source configuration, scanning, and reading comprises:
performing data source configuration according to the independent variable X and dependent variable Y;
obtaining the minimum and maximum values of the independent variable X, performing an adjustment on the maximum and minimum values according to a value range;
scanning the data source, reading every recorded values of X and Y: x and y, and calculating the data grid Gx corresponding to x and y, saving the data into Gx.

5. The method according to claim 1, wherein the calculated quartile of the data in each data grid Gx of each scale level comprises: lowest quartile, first quartile, median quartile, third quartile, and highest quartile.

6. The method according to claim 1, wherein the step of using a quartile graph to display data comprises:
the data to be displayed by using a quartile graph is the data stored in Gx.

7. The method according to claim 6, wherein the step of using a quartile graph to display data further comprises:
the display is performed a change to the upper limit or lower limit and an overall movement in a dragging manner within the range.

8. The method according to claim 6, wherein the step of using a quartile graph to display data further comprises:
selecting a region to perform the display, the display refers to detailed information corresponding to the data grid Gx.

9. The method according to claim 1, wherein the step of using a quartile graph to display data further comprises:
the display is performed a change to the upper limit or lower limit and an overall movement in a dragging manner within the range.

10. The method according to claim 1, wherein the step of using a quartile graph to display data further comprises:
selecting a region to perform the display, the display refers to detailed information corresponding to the data grid Gx.

11. A visualization system for displaying data based on quartile graph, the system comprising:
a data grid defining unit configured for defining a data grid (Gx) and determining the display scale of the X axis by calculating the value range of an independent variable X, and performing a discretization on the independent variable X;
a data source obtaining unit configured for data source configuration, scanning, and reading;
a data source storing unit configured for analyzing stored data and correcting the display scale of the X axis, and calculating the quartile of the data in each data grid (Gx) of each scale level;
a data display unit configured for using a quartile graph to display the data.

12. The system according to claim 11, wherein according to the minimum and maximum values of the independent variable X determined by the data grid defining unit, the data source obtaining unit performs an adjustment on the maximum and minimum values according to a value range, and scans the data source, reads every recorded values of X and Y: x and y, and calculates the data grid Gx corresponding to x and y.

13. The system according to claim 11, wherein the data displayed by the data display unit is the data within the data grid Gx stored by the data source storing unit.

* * * * *